(12) United States Patent
Moon et al.

(10) Patent No.: US 8,120,204 B2
(45) Date of Patent: Feb. 21, 2012

(54) LOAD SHARING DEVICE AND PARALLEL POWER SUPPLY THEREWITH

(75) Inventors: Gun Woo Moon, Daejeon-Si (KR); Sang Cheol Bong, Suwon-Si (KR); Kang Hyun Yi, Daejeon-si (KR); Ki Bum Park, Daejeon-Si (KR); Dong Seong Oh, Incheon-Si (KR); Chong Eun Kim, Daejeon-Si (KR); Jong Pil Kim, Gwacheon-Si (KR); Dong Joong Kim, Suwon-Si (KR); Tae Won Heo, Suwon-Si (KR); Don Sik Kim, Gunpo-Si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 222 days.

(21) Appl. No.: 12/545,721

(22) Filed: Aug. 21, 2009

(65) Prior Publication Data

US 2011/0001359 A1 Jan. 6, 2011

(30) Foreign Application Priority Data

Jul. 3, 2009 (KR) .................. 10-2009-0060567

(51) Int. Cl.
*H02J 1/10* (2006.01)
(52) U.S. Cl. ............................................. 307/32
(58) Field of Classification Search .................. 307/32
See application file for complete search history.

(56) References Cited

U.S. PATENT DOCUMENTS

| | | | | |
|---|---|---|---|---|
| 4,074,146 A * | 2/1978 | Buonavita | .................. | 307/60 |
| 4,924,170 A * | 5/1990 | Henze | .................. | 323/272 |
| 5,122,726 A * | 6/1992 | Elliott et al. | .................. | 323/272 |
| 5,200,643 A * | 4/1993 | Brown | .................. | 307/53 |
| 5,319,536 A * | 6/1994 | Malik | .................. | 363/65 |
| 5,521,809 A * | 5/1996 | Ashley et al. | .................. | 363/71 |
| 5,675,480 A * | 10/1997 | Stanford | .................. | 307/58 |
| 6,160,725 A * | 12/2000 | Jansen | .................. | 363/65 |
| 6,166,455 A * | 12/2000 | Li | .................. | 307/43 |
| 6,356,471 B1 * | 3/2002 | Fang | .................. | 363/65 |
| 6,424,129 B1 * | 7/2002 | Lethellier | .................. | 323/272 |
| 6,670,794 B1 * | 12/2003 | Wang et al. | .................. | 323/213 |
| 6,788,036 B1 * | 9/2004 | Milavec et al. | .................. | 323/272 |
| 6,822,426 B1 * | 11/2004 | Todd et al. | .................. | 323/275 |
| 6,897,636 B2 * | 5/2005 | Harris | .................. | 323/272 |
| 7,466,116 B2 * | 12/2008 | Sato et al. | .................. | 323/285 |
| 7,479,772 B2 * | 1/2009 | Zane et al. | .................. | 323/272 |
| 7,589,511 B2 * | 9/2009 | Dong et al. | .................. | 323/285 |
| 2002/0163255 A1 | 11/2002 | Soo et al. | | |
| 2003/0141907 A1 * | 7/2003 | Canova et al. | .................. | 327/131 |
| 2006/0107075 A1 | 5/2006 | Gentillet et al. | | |
| 2008/0309299 A1 * | 12/2008 | Wei et al. | .................. | 323/247 |
| 2009/0051335 A1 * | 2/2009 | Huang | .................. | 323/268 |
| 2010/0013307 A1 * | 1/2010 | Heineman et al. | .................. | 307/33 |

\* cited by examiner

*Primary Examiner* — Jared Fureman
*Assistant Examiner* — Adi Amrany
(74) *Attorney, Agent, or Firm* — Lowe, Hauptman, Ham & Berner, LLP

(57) ABSTRACT

A load sharing device for load balancing among a plurality of power supply modules connected in parallel to a single load includes a common voltage control signal output unit and output voltage control units corresponding to the power supply modules, respectively. The common voltage control signal output unit generates a common voltage control signal from output voltages of the power supply modules and outputs the common voltage control signal to the power supply modules. The output voltage control units detect output currents of the power supply modules and control the output voltages of the power supply modules to be in a predetermined voltage range according to the common voltage control signal and the detected output currents.

12 Claims, 7 Drawing Sheets

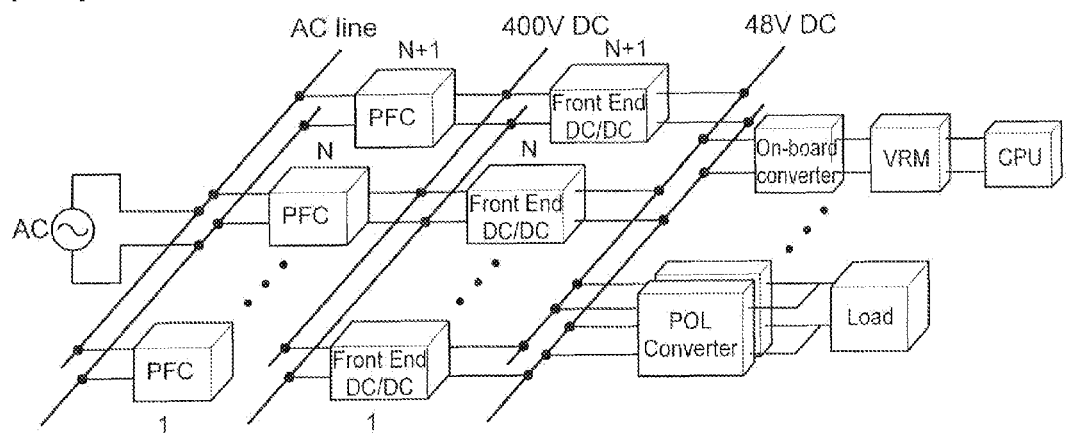
[FIG. 1]
- PRIOR ART -
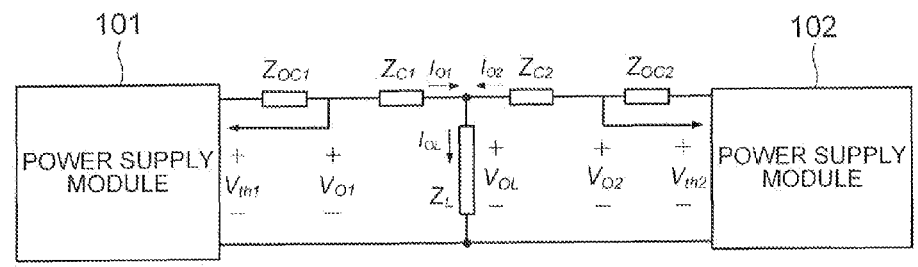
[FIG. 2A]
- PRIOR ART -

[FIG. 2B]
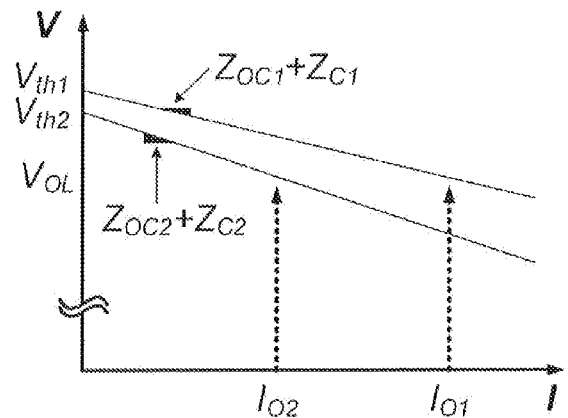
- PRIOR ART -
[FIG. 3A]
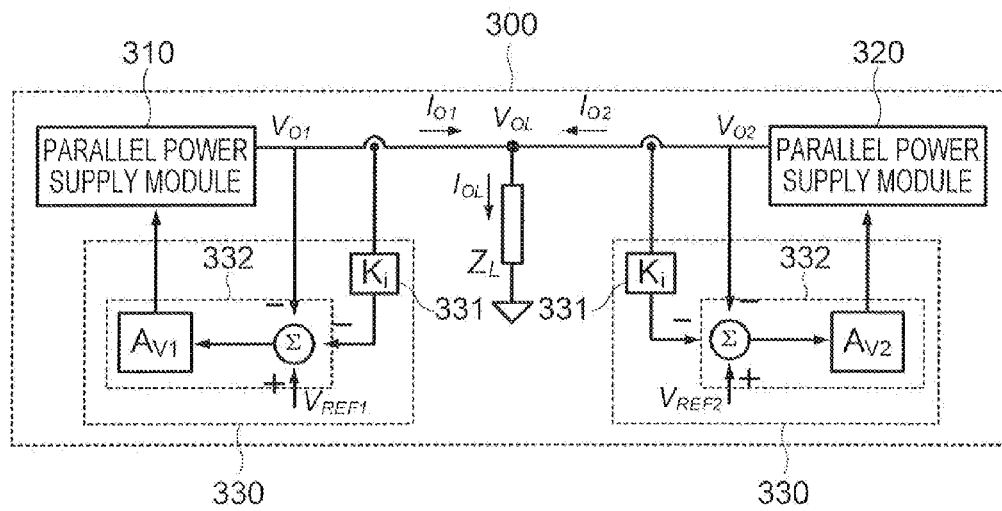

[FIG. 3B]
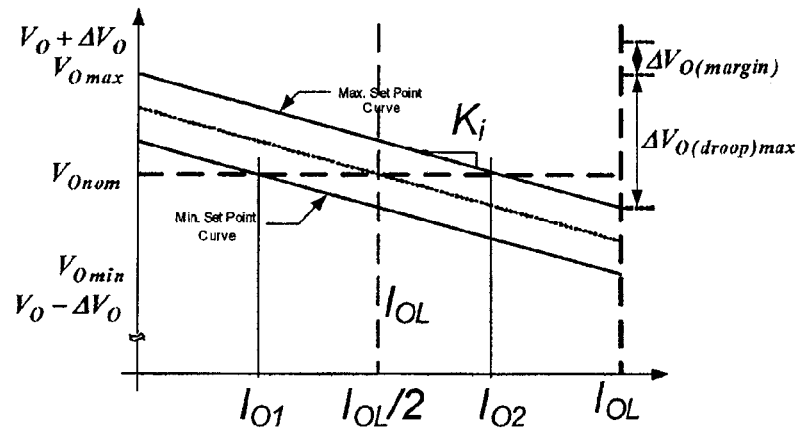
[FIG. 4]
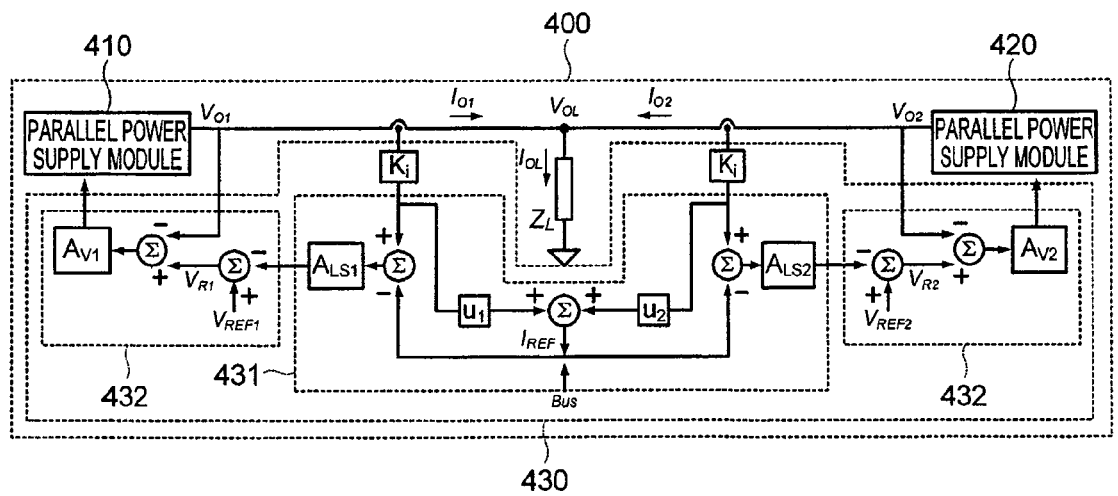

[FIG. 5]
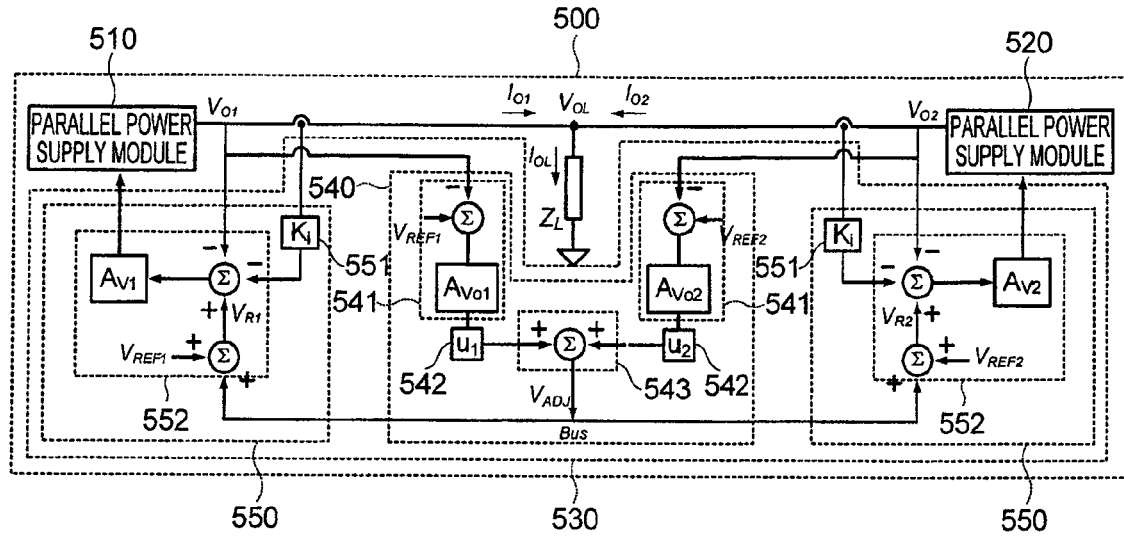
[FIG. 6A]
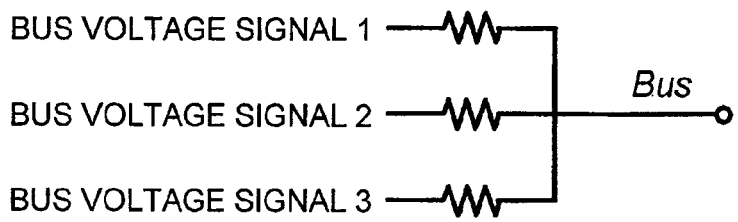
[FIG. 6B]
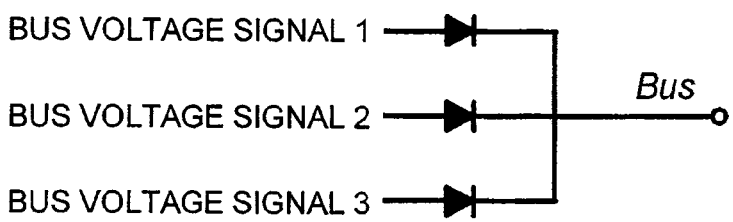

[FIG. 6C]
[FIG. 7A]
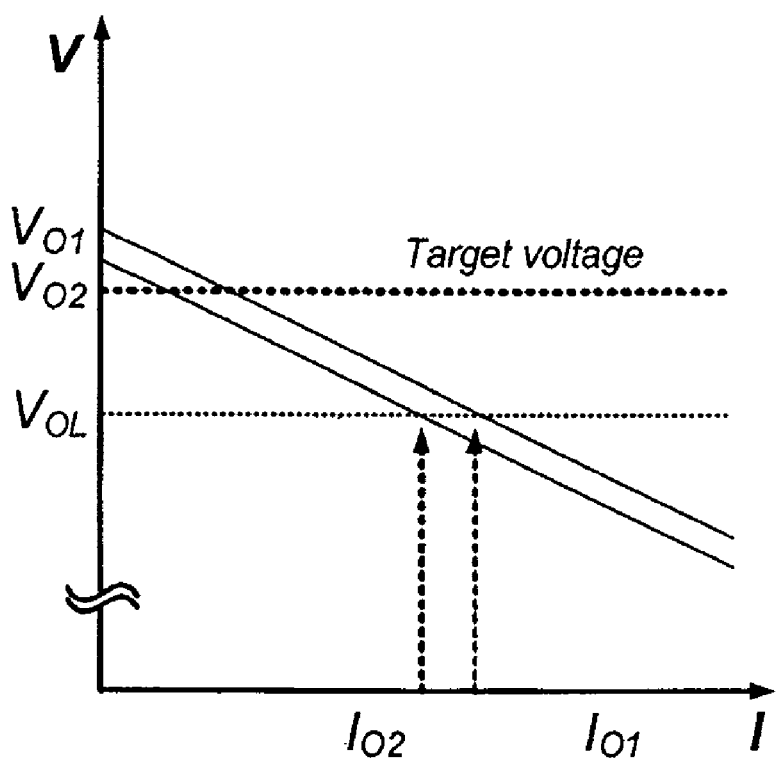

[FIG. 7B]
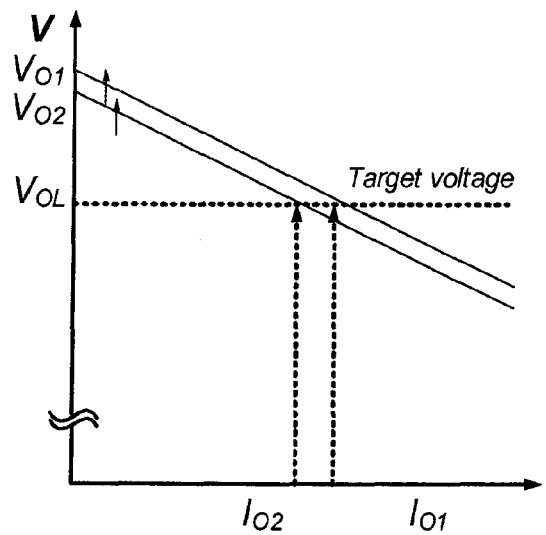
[FIG. 8]
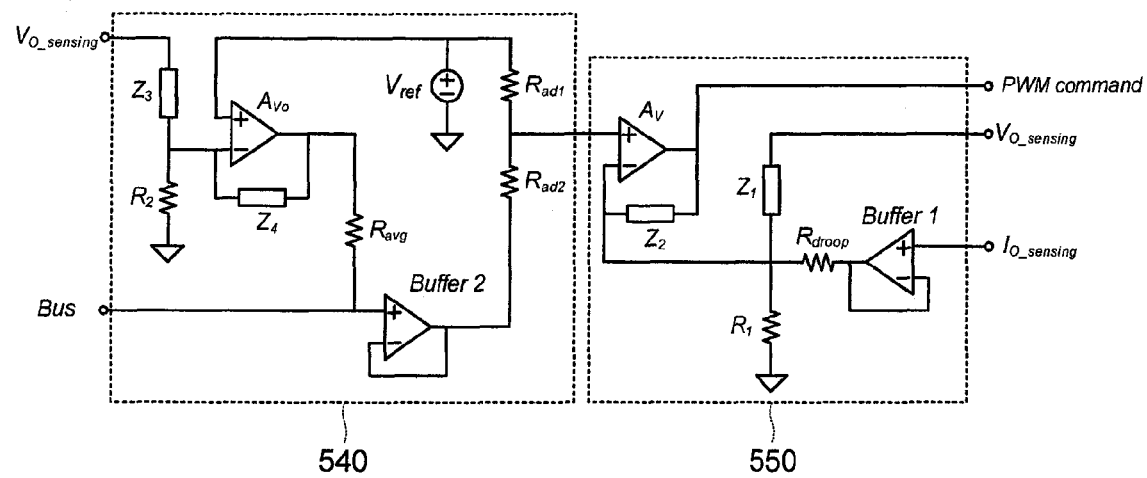

[FIG. 9]
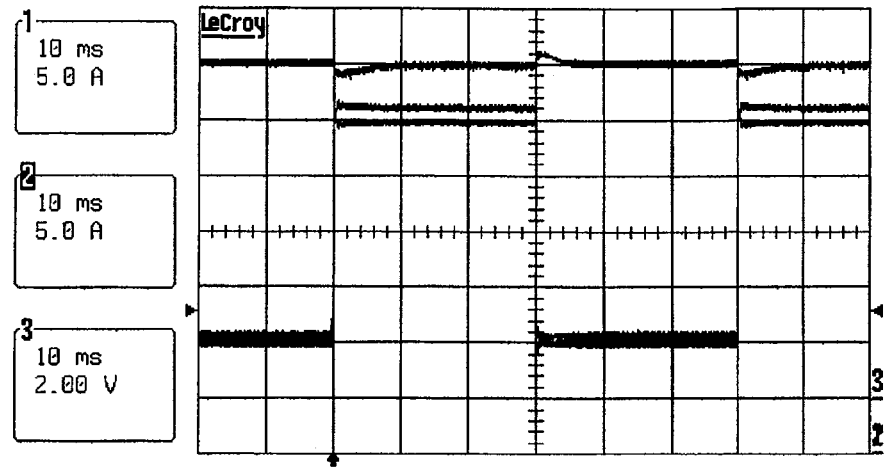
[FIG. 10]
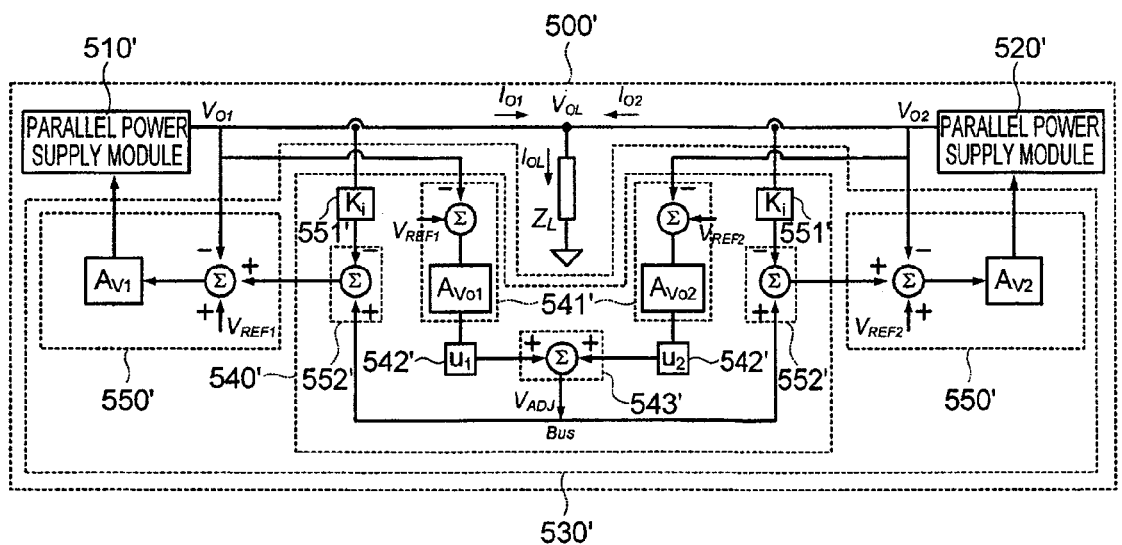

LOAD SHARING DEVICE AND PARALLEL POWER SUPPLY THEREWITH

CROSS REFERENCES RELATED APPLICATIONS

The present application claims priority under 35 U.S.C. 119 and 35 U.S.C. 365 to Korean Patent Application No. 10-2009-0060567 (filed on Jul. 3, 2009), which is hereby incorporated by reference in its entirety.

BACKGROUND OF THE INVENTION

1. Field of the Invention

The present invention relates to a load sharing device and a parallel power supply therewith, and more particularly, to a load sharing device that can more simply implement a LS control constitution and obtain more improved load sharing property, while maintaining output voltage of each of parallel power supply modules within a control range, and a parallel power supply therewith.

2. Description of the Related Art

Generally, a medium-large capacity power device widely uses a plurality of power supply modules connected in parallel, and FIG. 1 is a diagram showing a specific example of the power supply including such parallel power supply modules.

Referring to FIG. 1, the power supply is configured of an AC-DC front end converter, a point-of-load (POL) converter, etc. The AC-DC front end converter converts AC voltage into DC bus voltage, and it supplies power to each load through the POL converter. In such a power supply, the AC-DC convert and the POL converter widely use a parallel module shape due to the following reasons:

(1) Thermal management and reliability: In a parallel structure, each power module operates only a portion of the entire power to reduce the loss power of each module, such that the thermal management is facilitated and the reliability of a system is enhanced.

(2) Redundancy: In a system requiring a high reliability, a redundant structure of N+1, as shown in FIG. 1, is used. In other words, one module is added into n minimum parallel modules to be driven, the system is operated using the n modules when any one module is out of order, such that the system can be maintained and fixed without affecting the load and the entire system.

(3) Modularity: A parallel structure facilitates a modularity design of a system. In other words, only the number of module can be controlled and applied according to a capacity of the system using one designed module.

Based on the above reasons, it is preferable to implement a power supply having a parallel constitution rather than a unitary power supply, and the power supply having such a parallel constitution will be described with reference to FIG. 2.

FIG. 2 is a diagram explaining a structure where two independent power modules are driven in parallel, wherein (a) is a equivalent circuit view showing a structure where two parallel power modules are driven, and (b) is a graph showing current distribution property of the equivalent circuit shown in (a).

Referring to FIG. 2, each of power supply modules 101 and 102 can implement an equivalent circuit with output voltages $V_{th1}$ and $V_{th2}$ and output resistors $Z_{oc1}$ and $Z_{oc2}$, in unloading. If the output voltages $V_{th1}$ and $V_{th2}$, the output resistors $Z_{oc1}$ and $Z_{oc2}$, and parasitic resistors $Z_{c1}$ and $Z_{c2}$ of the two modules 101 and 102 are ideally the same, output currents $I_{o1}$ and $I_{o2}$ is evenly distributed to the two modules 101 and 102 to be flowed.

However, since there is actually a deviation between the two modules 101 and 102, as shown in FIG. 2(b), the current distribution property is determined in voltage $V_{oL}$ of a junction node of the two modules. In other words, as the deviation of the voltage $V_{th1}$ and $V_{th2}$ and the resistors $Z_{oc1}+Z_{c1}$ and $Z_{oc2}+Z_{c2}$ is larger, the load sharing (LS) property, which is the current distribution property, is deteriorated.

Therefore, in the case of a 12V power device for server, although an error of initial output voltage between the two modules 101 and 102 is only several tens of mV, one module bears all load current. For this reason, in the parallel power supply, there is a demand for an additional LS control for enhancing the reliability and improving the LS property.

Reviewing one example of such a LS control in the related art, it may be divided largely into a LS control in a drop current sharing mode (hereinafter, referred to as 'Droop mode') and a LS control in an active current sharing mode (hereinafter, referred to as 'Active mode').

However, with such technologies in the related art, problems arise in that LS errors are large and output voltages of the respective power supply modules cannot escape from a control range (the LS control in the Droop mode), and a control is relatively complicated and the change in the output voltages due to the LS control may become large when a deviation of individual modules is large (the LS control in the Active mode). Such problems act as a limitation in accomplishing the more improved LS property through a simple implementation, such that they are not preferable LS control technologies.

In order to overcome such problems, there is an acute demand for a load sharing device that can more simply implement a LS control constitution and obtain more improved LS property, while maintaining the output voltages of the respective parallel power supply modules within a control range, and a parallel power supply therewith.

SUMMARY OF THE INVENTION

The present invention proposes to solve the problems. It is an object of the present invention to provide a load sharing device that can more simply implement a LS control constitution and obtain more improved LS property, while maintaining the output voltages of the respective parallel power supply modules within a control range, and a parallel power supply therewith.

In order to accomplish the objects, there is provided a load sharing device for a load balancing between a plurality of power supply modules connected to a single load in parallel, including: a common voltage control signal output unit that generates common voltage control signals from output voltages of the plurality of power supply modules and outputs the common voltage control signals to the plurality of power supply modules; and output voltage control units that are provided in the respective plurality of power supply modules to detect output currents of the plurality of power supply modules and to control output voltages of the plurality of power supply modules according to the detected signals, controlling the output voltages to be in a predetermined voltage range according to the common voltage control signals.

The common voltage control signal output unit includes: a voltage controller that adds output voltages and reference voltages of the plurality of power supply modules to amplify and control the results with a predetermined gain; a bus voltage signal output device that amplifies output of the voltage controller with the predetermined gain to generate and output bus voltage signals for using a bus; a common voltage control signal generator that combines the bus voltage signals to generate the common voltage control signals; and a common bus that is mutually connected to the plurality of power supply modules to output the common voltage control signals to the plurality of power supply modules.

The common voltage control signal is any one of an average value of bus voltage signals, a maximum value of the bus voltage signals, and a minimum value of the bus voltage signals.

The output voltage control unit includes: an output current detector that amplifies and detects the output currents of the plurality of power supply modules with the predetermined gain; and an output voltage controller that compares the results obtained by adding the common voltage control signals and the reference voltages of the plurality of power supply modules with the results obtained by adding the voltage signals amplified and detected by the output current detector and the output voltages of the plurality of power supply modules and amplifies and controls the output voltages according to the difference.

In order to accomplish the objects, there is provided another load sharing device for a load balancing between a plurality of power supply modules connected to a single load in parallel, including: a control signal output unit that generates common voltage control signals from output voltages of the plurality of power supply modules, detects output currents of the plurality of power supply modules, and outputs control signals combining the common voltage control signals and the signals according to the output currents; and output voltage control units that are provided in the respective plurality of power supply modules to control the output voltages to be in a predetermined voltage range simultaneously with controlling the output voltage according to the control signals.

The control signal output unit includes: an output current detector that amplifies and detects the output currents of the plurality of power supply modules with a predetermined gain; a voltage controller that adds the output voltages and reference voltages of the plurality of power supply modules to amplify and control the results with the predetermined gain; a bus voltage signal output device that amplifies the output of the voltage controller with the predetermined gain to generate and output bus voltage signals for using a bus; a common voltage control signal generator that combines the bus voltage signals to generate the common voltage control signals; a common bus that outputs the generated common voltage control signals; and a control signal output device that compares the common voltage control signals output from the common bus with the voltage signals amplified and detected by the output current detector to output control signals according to the difference.

The common voltage control signal is any one of an average value of bus voltage signals, a maximum value of the bus voltage signals, and a minimum value of the bus voltage signals.

The output voltage control unit compares the results obtained by adding the control signals and the reference voltages of the plurality of power supply modules with the output voltages of the plurality of power supply modules to amplify and control the output voltages according to the difference.

In order to accomplish the objects, there is provided a parallel power supply, including: a plurality of power supply modules each connected to a single load in parallel to provide balanced output currents to the single load; a common voltage control signal output unit that generates a common voltage control signal from output voltages of the plurality of power supply modules and outputs the common voltage control signals to the plurality of power supply modules; and output voltage control units that are provided in the respective plurality of power supply modules to detect output currents of the plurality of power supply modules and to control output voltages of the plurality of power supply modules according to the detected signals, controlling the output voltages to be in a predetermined voltage range according to the common voltage control signals.

The common voltage control signal output unit includes: a voltage controller that adds output voltages and reference voltages of the plurality of power supply modules to amplify and control the results with a predetermined gain; a bus voltage signal output device that amplifies output of the voltage controller with the predetermined gain to generate and output bus voltage signals for using a bus; a common voltage control signal generator that combines the bus voltage signals to generate the common voltage control signals; and a common bus that is mutually connected to the plurality of power supply modules to output the common voltage control signals to the plurality of power supply modules.

The common voltage control signal is any one of an average value of bus voltage signals, a maximum value of the bus voltage signals, and a minimum value of the bus voltage signals.

The output voltage control unit includes: an output current detector that amplifies and detects the output currents of the plurality of power supply modules with the predetermined gain; and an output voltage controller that compares the results obtained by adding the common voltage control signals and the reference voltages of the plurality of power supply modules with the results obtained by adding the voltage signals amplified and detected by the output current detector and the output voltages of the plurality of power supply modules and amplifies and controls the output voltages according to the difference.

In order to accomplish the objects, there is provided another parallel power supply, including: a plurality of power supply modules each connected to a single load in parallel to provide balanced output currents to the single load; a control signal output unit that generates a common voltage control signal from output voltages of the plurality of power supply modules, detects output currents of the plurality of power supply modules, and outputs control signals combining the common voltage control signals and signals according to the output currents; and output voltage control units that are provided in the respective plurality of power supply modules to control the output voltages to be in a predetermined voltage range simultaneously with controlling the output voltage according to the control signals.

The control signal output unit includes: an output current detector that amplifies and detects the output currents of the plurality of power supply modules with a predetermined gain; a voltage controller that adds the output voltages and reference voltages of the plurality of power supply modules to amplify and control the results with the predetermined gain; a bus voltage signal output device that amplifies the output of the voltage controller with the predetermined gain to generate and output bus voltage signals for using a bus; a common voltage control signal generator that combines the bus voltage signals to generate the common voltage control signals; a common bus that outputs the generated common voltage control signals; and a control signal output device that compares the common voltage control signals output from the common bus with the voltage signals amplified and detected by the output current detector to output control signals according to the difference.

The common voltage control signal is any one of an average value of bus voltage signals, a maximum value of the bus voltage signals, and a minimum value of the bus voltage signals.

The output voltage control unit compares the results obtained by adding the control signals and the reference voltages of the plurality of power supply modules with the output voltages of the plurality of power supply modules to amplify and control the output voltages according to the difference.

BRIEF DESCRIPTION OF THE DRAWINGS

FIG. 1 is a diagram showing a specific example of a power supply system including parallel power supply modules;

FIG. 2 is a diagram explaining a structure where two independent power modules are driven in parallel:
(a) is a equivalent circuit view showing a structure where two parallel power modules are driven, and
(b) is a graph showing current distribution property of the equivalent circuit shown in (a);

FIG. 3 is a diagram explaining a LS control in a Droop mode:
(a) is a control block diagram of a parallel power supply to which the LS control in the Droop mode is applied, and
(b) is a graph showing the LS property of (a);

FIG. 4 is a control block diagram of a parallel power supply to which a LS control in an Active mode is applied;

FIG. 5 is a control block diagram of a parallel power supply according to Embodiment 1 of the present invention;

FIG. 6 is an explanation diagram of a method for generating common voltage control signals:
(a) is a diagram showing a method for generating the common voltage control signals as an average value of bus voltage signals using the same resistance,
(b) is a diagram showing a method for generating the common voltage control signals as a maximum value of bus voltage signals using diodes, and
(c) is a diagram showing a method for generating the common voltage control signals as a minimum value of bus voltage signals using diodes;

FIG. 7 is a graph explaining LS property of the parallel power supply according to Embodiment 1 of the present invention;

FIG. 8 is a circuit view showing a designed example of a control block diagram according to Embodiment 1 of the present invention;

FIG. 9 is a graph showing experimental results using the circuit view of FIG. 8; and FIG. 10 is a control block diagram of a parallel power supply according to Embodiment 2 of the present invention.

DESCRIPTION FOR KEY ELEMENTS IN THE DRAWINGS 500, 500': Parallel power supplies
510, 510', 520, 520': Parallel power supply modules
530, 530': Load sharing devices
540: Common voltage control signal output unit
540': Control signal output unit
541, 541': Voltage controllers
542, 542': Bus voltage signal output devices
543, 543': Common voltage control signal generator
Bus: Common bus
550, 550': Output voltage control unit
551, 551': Output current detector
552: Output voltage controller
552': Control signal output device

DETAILED DESCRIPTION OF THE PREFERRED EMBODIMENTS

FIG. 3 is a diagram explaining a LS control in a Droop mode: (a) is a control block diagram of a parallel power supply to which the LS control in the Droop mode is applied, and (b) is a graph showing the LS property of (a). As aforementioned, this relates to the parallel power supply to which one example of the LS control technology in the related art is applied.

Referring to FIG. 3, the parallel power supply 300 in FIG. 3 includes parallel power supply modules 310 and 320 connected to a single load $Z_L$ in parallel and a load sharing device 330 in the Droop mode.

The parallel power supply modules 310 and 320 have the load sharing device 330 on an output voltage detection path, respectively, to provide balanced output currents $I_{O1}$ and $I_{O2}$ to the single load $Z_L$.

Herein, the feature to provide the balanced output currents means that the respective parallel power supply modules 310 and 320 provide the output currents $I_{O1}$ and $I_{O2}$ having approximately the same size (½ of $I_{OL}$).

The load sharing device 330 in the Droop mode includes an output current detector 331 and an output voltage controller 332, wherein the load sharing device 300 detects the output currents and inserts the output currents to the output voltage detection path therethrough, thereby controlling the LS property.

The output current detector 331 includes current detection resistance and an amplifier (not shown), thereby amplifying and detecting the output currents of the respective parallel power supply modules 310 and 320 with an output current detection gain $K_i$. At this time, in order to reduce the loss in the current detection resistance, small resistance is used and the output resistance is in proportion to the output current detection gain $K_i$.

The output voltage controller 332 compares reference voltages $V_{REF1}$ and $V_{REF2}$ of the respective parallel power supply modules 310 and 320 with the results obtained by adding the voltage signals amplified and detected by the output current detector 331 and the output voltages $V_{O1}$ and $V_{O2}$ of the respective parallel power supply modules 310 and 320, thereby amplifying $A_{V1}$ and $A_{V2}$ and controlling the respective output voltages $V_{O1}$ and $V_{O2}$ according to the difference.

Through the constitution as described above, the respective parallel power supply modules 310 and 320 provide the balanced output currents $I_{01}$ and $I_{02}$ to the single load $Z_L$, thereby having the improved LS property, as shown in FIG. 3(b).

However, the LS control in the Droop mode, which improves the LS property by increasing the output resistance of the respective parallel power supply modules through the method as described above, can be simply implemented, but LS errors are large and the currents $I_{01}$ and $I_{02}$ flowed into the single load $Z_L$ from the respective parallel power supply modules 310 and 320 are increased to reduce the output voltages $V_{01}$ and $V_{02}$ of the respective modules 310 and 320, thereby having a problem that the output voltages of the respective modules 310 and 320 may escape from a control range, if the output current detection gain $K_i$ is not previously considered at the time of design.

FIG. 4 is a control block diagram of a parallel power supply to which a LS control in an Active mode is applied. As aforementioned, this relates to the parallel power supply to which one example of the LS control technology in the related art is applied.

Referring to FIG. 4, the parallel power supply 400 in FIG. 4 includes parallel power supply modules 410 and 420 connected to a single load $Z_L$ in parallel and a load sharing device 430 in the Active mode.

The parallel power supply modules 410 and 420 have the load sharing device 430 to provide balanced output currents $I_{O1}$ and $I_{O2}$ to the single load $Z_L$. Herein, the feature to provide the balanced output current is the same as shown in the LS control in the Droop mode.

The load sharing device 430 in the Active mode includes a control signal output device 431 and an output voltage controller 432, wherein the load sharing device 430 performs the LS control that controls the output voltages $V_{O1}$ and $V_{O2}$ of the respective power supply modules 410 and 420 through the constitution as described above.

The control signal output device 431 generates a common current signal $I_{REF}$ from the output currents of the respective power supply modules 410 and 420, outputs the common current signal $I_{REF}$ using a common bus, and compares the common current signal $I_{REF}$ with the output currents I01 and I02 of the respective modules 410 and 42, thereby amplifying and outputting the control signal according to the difference with predetermined gains $A_{LS1}$ and $A_{LS2}$.

The output voltage controller 432 compares the results obtained by comparing the reference voltages $V_{REF1}$ and $V_{REF2}$ of the respective parallel power supply modules 410 and 420 with the control signal amplified and output by the control signal output device 431 with the output voltages $V_{O1}$ and $V_{O2}$ of the respective parallel supply modules 410 and 420, thereby amplifying $A_{V1}$ and $A_{V2}$ and controlling the respective output voltages $V_{O1}$ and $V_{O2}$ according to the difference.

With the LS control in the Active mode, the LS control is performed by directly comparing the output currents of the respective modules to have excellent LS property and further the constitution 431 to output the control signal exists in the outside of the respective modules 410 and 420 to be easily expanded from the conventionally designed power modules, however, problem arise in that the control thereof is relatively complicated and the change of the output voltage by the LS control may be increased when there is a large deviation between the respective modules.

The LS control technologies in FIGS. 3 and 4 as described above have several problems, as aforementioned, and such problems act as a limitation in accomplishing the improved LS property through a simple implementation so that they are not preferable LS control technologies.

In order to overcome the problems, there is a demand for a load sharing device that can more simply implement the LS control constitution and obtain the more improved LS property, while maintaining the output voltage of the respective parallel power supply modules within a control range, and a parallel power supply therewith. The present invention relates to such a load sharing device and such a parallel power supply therewith.

Hereinafter, exemplary embodiments of the present invention will be described in detail with reference to the accompanying drawings. Like reference numerals designate like elements throughout the specification.

Embodiment 1

FIG. 5 is a control block diagram of a parallel power supply according to Embodiment 1 of the present invention.

Referring to FIG. 5, the parallel power supply 500 according to Embodiment 1 of the present invention includes a plurality of parallel power supply modules 510 and 520 and a load sharing device 530.

The respective parallel power supply modules 510 and 520 are connected to a single load $Z_L$ in parallel and perform a load balancing to provide balanced output currents $I_{o1}$ and $I_{o2}$ to the single load $Z_L$ through the load sharing load 530. Herein, the feature to provide the balanced output currents has been already described in FIGS. 3 and 4, such that the detailed description thereof will be omitted.

The load sharing device 530 includes a common voltage control signal output unit 540 and an output voltage control unit 550.

The common voltage control signal output unit 540 generates a common voltage control signal $V_{ADJ}$ from the output voltages $V_{O1}$ and $V_{O2}$ of the respective parallel power supply modules 510 and 520 and outputs the generated common voltage control signal $V_{ADJ}$ to the respective parallel power supply modules 510 and 520. The common voltage control signal output unit 540 specifically includes a voltage controller 541, a bus voltage signal output device 542, a common voltage control signal generator 543, and a common bus Bus.

The voltage controller 541 adds the output voltages $V_{O1}$ and $V_{O2}$ of the respective parallel power supply modules 510 and 520 and reference voltages $V_{REF1}$ and $V_{REF2}$ of the respective parallel power supply modules 510 and 520, thereby amplifying and controlling the results thereof with predetermined gains $A_{VO1}$ and $A_{VO2}$.

The bus voltage signal output device 542 amplifies the output of the voltage controller 541 with predetermined signal gains $u_1$ and $u_2$ to generate a bus voltage signal for using the common bus Bus, thereby outputting the bus voltage signal to the common voltage control signal generator 543.

The common voltage control signal generator 543 combines the respective bus voltage signals output from the bus voltage signal output device 542 to generate a common voltage control signal $V_{ADJ}$. The common voltage control signal $V_{ADJ}$ may be generated as an average value of the respective bus voltage signals using the same resistors as shown in FIG. 6(a) or may be generated as a maximum value or a minimum value of the respective bus voltage signals using diodes as shown in FIGS. 6(b) and (c).

The common bus Bus is mutually connected to the respective power supply modules 510 and 520 to output the common voltage control signal $V_{ADJ}$ generated from the common voltage control signal generator 543 to an output voltage control unit 550 in each of parallel power supply modules 510 and 520.

The output voltage control unit 550 are provided in the respective parallel power supply modules 510 and 520 to detect the output currents $I_{o1}$ and $I_{o2}$ of the respective parallel power supply modules 510 and 520 and to control the output voltages $V_{O1}$ and $V_{O2}$ of the respective parallel power supply modules 510 and 520 according to the signals of the detected output currents $I_{o1}$ and $I_{o2}$, controlling the output voltages $V_{O1}$ and $V_{O2}$ to be in a predetermined voltage range, that is, in an output voltage control range, according to the common voltage control signal $V_{ADJ}$ output from the common voltage control signal output unit 540. The output voltage control unit 550 specifically includes an output current detector 551 and an output voltage controller 552.

The output current detector 551, which may include a current detecting resistor, an amplifier (not shown), etc., amplifies and detects the output currents $I_{o1}$ and $I_{o2}$ of the respective parallel power supply modules 510 and 520 with the predetermined output current detection gain $K_i$.

The output voltage controller 552 compares the results $V_{R1}$ and $V_{R2}$ obtained by adding the common voltage control signal $V_{ADJ}$ output from the common voltage control signal output unit 540 and the reference voltages $V_{REF1}$ and $V_{REF2}$ of the respective parallel power supply modules 510 and 520 with the results obtained by adding the voltage signal amplified and detected by the output current detector 551 and the output voltages of the respective parallel power supply modules 510 and 520, thereby amplifying $A_{V1}$ an $A_{V2}$ and controlling the output voltages $V_{O1}$ and $V_{O2}$ according to the difference.

FIG. 7 is a graph explaining LS property of the parallel power supply according to Embodiment 1 of the present invention.

The parallel power supply 500 according to Embodiment 1 applies a Droop mode that detects output currents to insert them to an output voltage detection path, making it possible to more simply design the LS control constitution and to improve the LS property between the respective parallel power supply modules by greatly increasing the output resistances. However, if the Droop mode is applied, as aforementioned, the output voltage is reduced as the output currents are increased so that the output voltage may escape from the control range, as shown in FIG. 7(a). However, in the present invention, the constitution to output the common voltage control signal 540 (a common voltage control signal output unit) is provided in the outside of the respective parallel power supply modules, making it possible to control the output voltages, while evenly increasing the output voltages of the respective modules, as shown in FIG. 7(b). In other words, the present invention can obtain the more improved LS property by the large output resistances, while maintaining the output voltages of the respective parallel power supply modules within the control range.

FIG. 8 is a circuit view showing a designed example of a control block diagram according to Embodiment 1 of the present invention.

Referring to FIG. 8, the common voltage control signal output unit 540 in FIG. 5 may include an amplifier Avo, impedances $Z_3$ and $Z_4$, resistors $R_2$, $R_{avg}$, $R_{ad1}$ and $R_{ad2}$, and a reference power source Vref, and a buffer Buffer.

The common voltage control signal output from the common voltage control signal output unit 540 may be formed as an average value of the respective bus voltage signals through the resistor $R_{avg}$ implemented by the method as shown in FIG. 6(a), thereby being output to an output voltage control unit 550 of the respective parallel power supply modules by the common bus Bus.

The common voltage control signal output by the common bus Bus is applied to an non-inverting terminal (reference terminal of the output voltage control unit) of the amplifier Av in the output voltage control unit 550 through a composition of resistance using the reference voltage Vref of the respective parallel power supply modules and the resistors $R_{ad1}$ and $R_{ad2}$ via the buffer Buffer.

In addition, the output voltage control unit 550 in FIG. 5 may be implemented by inserting only output current information into a general output voltage controller. Referring to FIG. 8, the output voltage controller may include an amplifier Av, impedances $Z_1$ and $Z_2$, and a resistor $R_1$. The output resistance can be improved by inserting an output current detecting signal $I_{o\_sensing}$ to an inverting terminal of the amplifier Av using a current detecting resistor $R_{droop}$.

The non-inverting terminal of the amplifier Av is applied with the common voltage control signal output by the common bus Bus through the composition of resistance using the reference voltage Vref of the respective parallel power supply modules and the resistors $R_{ad1}$ and $R_{ad2}$ via the buffer Buffer, as aforementioned.

FIG. 9 is a graph showing experimental results using the circuit view of FIG. 8, wherein two buck-converters are paralley driven for the experiment, having experimental specifications of input voltage=16.5V, output voltage=12V, and output current=60 A.

The experimental waveforms in FIG. 9 are results obtained when load current is changed from 20 A to 60 A. As shown in FIG. 9, it can be appreciated that the remarkable LS property can be obtained in a normal state and even in an excessive state.

Embodiment 2

FIG. 10 is a control block diagram of a parallel power supply according to Embodiment 2 of the present invention.

Referring to FIG. 10, the parallel power supply 500' according to Embodiment 2 of the present invention includes a plurality of parallel power supply modules 510' and 520' and a load sharing device 530'.

The respective parallel power supply modules 510' and 520' are connected to a single load $Z_L$ in parallel and perform a load balancing to provide balanced output currents $I_{O1}$ and $I_{O2}$ to the single load $Z_L$ through the load sharing load 530'. Herein, the feature to provide the balanced output currents has been already described, such that the detailed description thereof will be omitted.

The load sharing device 530' includes a control signal output unit 540' and an output voltage control unit 550'.

The control signal output unit 540' generates a common voltage control signal $V_{ADJ}$ from output voltages $V_{O1}$ and $V_{O2}$ of the respective parallel power supply modules 510' and 520', detects output currents $I_{O1}$ and $I_{O2}$ of the respective parallel power supply modules 510' and 520', and outputs a control signal combining the generated common voltage control signal $V_{ADJ}$ and a signal according to the detected output currents $I_{O1}$ and $I_{O2}$. The control signal output unit 540' specifically includes an output current detector 551', a voltage controller 541', a bus voltage signal output device 542', a common voltage control signal generator 543', a common bus Bus, and a control signal output device 552'.

The output current detector 551', which may include a current detecting resistor, an amplifier (not shown), etc., amplifies and detects the output currents $I_{O1}$ and $I_{O2}$ of the respective parallel power supply modules 510' and 520' with the predetermined output current detection gain $K_i$.

The voltage controller 541' adds the output voltages $V_{O1}$ and $V_{O2}$ of the respective parallel power supply modules 510' and 520' and reference voltages $V_{REF1}$ and $V_{REF2}$ of the respective parallel power supply modules 510' and 520', thereby amplifying and controlling the results thereof with predetermined gains $A_{VO1}$ and $A_{VO2}$.

The bus voltage signal output device 542' amplifies the output of the voltage controller 541' with predetermined signal gains $u_1$ and $u_2$ to generate a bus voltage signal for using the common bus Bus, thereby outputting the bus voltage signal to the common voltage control signal generator 543'.

The common voltage control signal generator 543' combines the respective bus voltage signals output from the bus voltage signal output device 542' to generate a common voltage control signal $V_{ADJ}$. At this time, the common voltage control signal $V_{ADJ}$ may be generated as an average value of the respective bus voltage signals using the same resistors as shown in FIG. 6(a) or may be generated as a maximum value or a minimum value of the respective bus voltage signals using diodes as shown in FIGS. 6(b) and (c), in the same manner as Embodiment 1.

The common bus Bus outputs the common voltage control signal $V_{ADJ}$ generated from the common voltage control signal generator 543' to the control signal output device 552'.

The control signal output device 552' compares the common voltage control signal $V_{ADJ}$ output from the common bus Bus with the voltage signal amplified and detected by the output current detector 551', thereby outputting the control signal according to the difference to an output voltage control unit 550'.

The output voltage control unit 550' is provided within the respective parallel power supply modules 510' and 520' to control the output voltages $V_{O1}$ and $V_{O2}$ of the respective parallel power supply modules 510' and 520' to be in a predetermined voltage range, that is, in an output voltage control range, simultaneously with controlling the output voltages $V_{O1}$ and $V_{O2}$ of the respective parallel power supply modules 510' and 520' according to the control signal output from the control signal output unit 540'. More specifically, the output voltage control units 550' compares the results obtained by adding the control signal output from the control signal output unit 540' and the reference voltages $V_{REF1}$ and $V_{REF2}$ of the respective parallel power supply modules 510' and 520' with the output voltages of the respective parallel power supply modules 510' and 520', thereby amplifying $A_{V1}$ and $A_{V2}$ and controlling the output voltages $V_{O1}$ and $V_{O2}$ according to the difference.

The present invention according to Embodiment 2, which adds the LS control constitution to the conventionally designed module, adds the LS control constitution (the control signal output unit in the present embodiment) to the conventionally designed output voltage controller (the output voltage control unit in the present embodiment), making it possible to accomplish the LS property as shown in Embodiment 1. In other words, the output voltage control signal is made by combining the current signal to apply the Droop mode and the common voltage control signal to control the output voltage range and is then simply inserted into the output voltage detection spot of the conventional output voltage controller, making it possible to accomplish the LS property as shown in Embodiment 1.

In addition, the present invention according to Embodiment 2 adds the LS control constitution into the conventionally designed module to be easily expanded from the conventionally designed power module, making it possible to be simply implemented and designed.

The present invention can simply implement the LS control constitution and obtain the more improved LS property, while maintaining the respective output voltages of the parallel power supply modules within the control range.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A load sharing device for load balancing among a plurality of power supply modules connected in parallel to a single load, said device comprising:
   a common voltage control signal output unit for generating a common voltage control signal from output voltages of the plurality of power supply modules and outputting the common voltage control signal to the plurality of power supply modules; and
   output voltage control units corresponding to the plurality of power supply modules, respectively, to detect output currents of the plurality of power supply modules and to control the output voltages of the plurality of power supply modules to be in a predetermined voltage range according to the common voltage control signal and the detected output currents,
   wherein the common voltage control signal output unit includes:
   a plurality of voltage controllers corresponding to the plurality of power supply modules, respectively, each of the voltage controllers comprising
      an adder for adding a reference voltage to the output voltage of the respective power supply module, and
      an amplifier for amplifying a signal outputted from the adder;
   a plurality of bus voltage signal output devices for amplifying outputs of the voltage controllers to generate and output bus voltage signals;
   a common voltage control signal generator for combining the bus voltage signals to generate the common voltage control signal; and
   a common bus that is mutually connectable to the plurality of power supply modules to output the common voltage control signal to the plurality of power supply modules.

2. The load sharing device according to claim 1, wherein the common voltage control signal is any one of an average value of the bus voltage signals, a maximum value of the bus voltage signals, and a minimum value of the bus voltage signals.

3. The load sharing device according to claim 1, wherein each of the output voltage control units includes:
   an output current detector for detecting the output current of the respective power supply module and outputting a voltage signal corresponding to the detected output current; and
   an output voltage controller for
      obtaining a difference between (i) a first result obtained by adding a reference voltage to the common voltage control signal, and (ii) a second result obtained by adding the voltage signal outputted by the output current detector to the output voltage of the respective power supply module, and
      amplifying the difference and controlling the output voltage of the respective power supply module according to the amplified difference.

4. A load sharing device for load balancing among a plurality of power supply modules connected in parallel to a single load, said device comprising:
   a control signal output unit for generating a common voltage control signal from output voltages of the plurality of power supply modules, detecting output currents of the plurality of power supply modules, and outputting control signals combining the common voltage control signal with signals according to the detected output currents; and
   output voltage control units corresponding to the plurality of power supply modules, respectively, to control the output voltages to be in a predetermined voltage range according to the control signals,
   wherein the control signal output unit includes:
   a plurality of output current detectors corresponding to the plurality of power supply modules, respectively, for detecting the output currents of the plurality of power supply modules and outputting voltage signals corresponding to the detected output currents;
   a plurality of voltage controllers corresponding to the plurality of power supply modules, respectively, each of the voltage controllers comprising
      an adder for adding a reference voltage to the output voltage of the respective power supply module, and
      an amplifier for amplifying a signal outputted from the adder;
   a plurality of bus voltage signal output devices for amplifying outputs of the voltage controllers to generate and output bus voltage signals;

a common voltage control signal generator for combining the bus voltage signals to generate the common voltage control signal;
a common bus for outputting the generated common voltage control signal; and
a plurality of control signal output devices corresponding to the plurality of power supply modules, respectively, for outputting the control signals according to differences between (a) the common voltage control signal outputted from the common bus and (b) the voltage signals outputted by the output current detectors.

5. The load sharing device according to claim 4, wherein the common voltage control signal is any one of an average value of the bus voltage signals, a maximum value of the bus voltage signals, and a minimum value of the bus voltage signals.

6. The load sharing device according to claim 4, wherein each of the output voltage control units is configured to
obtain a difference between (i) a result obtained by adding a reference voltage to the control signal of the respective power supply module and (ii) the output voltage of the respective power supply module, and
amplify the difference and control the output voltage of the respective power supply module according to the amplified difference.

7. A parallel power supply, comprising:
a plurality of power supply modules connected in parallel to provide balanced output currents to a single load;
a common voltage control signal output unit for generating a common voltage control signal from output voltages of the plurality of power supply modules and outputting the common voltage control signal to the plurality of power supply modules; and
output voltage control units corresponding to the plurality of power supply modules, respectively, to detect output currents of the plurality of power supply modules and to control the output voltages of the plurality of power supply modules to be in a predetermined voltage range according to the common voltage control signal and the detected output currents,
wherein the common voltage control signal output unit includes:
a plurality of voltage controllers corresponding to the plurality of power supply modules, respectively, each of the voltage controllers comprising
an adder for adding a reference voltage to the output voltage of the respective power supply module, and
an amplifier for amplifying a signal outputted from the adder;
a plurality of bus voltage signal output devices for amplifying outputs of the voltage controllers to generate and output bus voltage signals;
a common voltage control signal generator for combining the bus voltage signals to generate the common voltage control signal; and
a common bus that is mutually connected to the plurality of power supply modules to output the common voltage control signal to the plurality of power supply modules.

8. The parallel power supply according to claim 7, wherein the common voltage control signal is any one of an average value of the bus voltage signals, a maximum value of the bus voltage signals, and a minimum value of the bus voltage signals.

9. The parallel power supply according to claim 7, wherein each of the output voltage control units includes:
an output current detector for detecting the output current of the respective power supply module and outputting a voltage signal corresponding to the detected output current; and
an output voltage controller for
obtaining a difference between (i) a first result obtained by adding a reference voltage to the common voltage control signal, and (ii) a second result obtained by adding the voltage signal outputted by the output current detector to the output voltage of the respective power supply module, and
amplifying the difference and controlling the output voltage of the respective power supply module according to the amplified difference.

10. A parallel power supply, comprising:
a plurality of power supply modules connected in parallel to provide balanced output currents to a single load;
a control signal output unit for generating a common voltage control signal from output voltages of the plurality of power supply modules, detecting output currents of the plurality of power supply modules, and outputting control signals combining the common voltage control signal with signals according to the detected output currents; and
output voltage control units corresponding to the plurality of power supply modules, respectively, to control the output voltages to be in a predetermined voltage range according to the control signals,
wherein the control signal output unit includes:
a plurality of output current detectors corresponding to the plurality of power supply modules, respectively, for detecting the output currents of the plurality of power supply modules and outputting voltage signals corresponding to the detected output currents;
a plurality of voltage controllers corresponding to the plurality of power supply modules, respectively, each of the voltage controllers comprising
an adder for adding a reference voltage to the output voltage of the respective power supply module, and
an amplifier for amplifying a signal outputted from the adder;
a plurality of bus voltage signal output devices for amplifying outputs of the voltage controllers to generate and output bus voltage signals;
a common voltage control signal generator for combining the bus voltage signals to generate the common voltage control signal;
a common bus for outputting the generated common voltage control signal; and
a plurality of control signal output devices corresponding to the plurality of power supply modules, respectively, for outputting the control signals according to differences between (a) the common voltage control signal outputted from the common bus and (b) the voltage signals outputted by the output current detectors.

11. The parallel power supply according to claim 10, wherein the common voltage control signal is any one of an average value of the bus voltage signals, a maximum value of the bus voltage signals, and a minimum value of the bus voltage signals.

12. The parallel power supply according to claim 10, wherein each of the output voltage control units is configured to
obtain a difference between (i) a result obtained by adding a reference voltage to the control signal of the respective power supply module and (ii) the output voltage of the respective power supply module, and
amplify the difference and control the output voltage of the respective power supply module according to the amplified difference.

* * * * *